(12) United States Patent
Lee

(10) Patent No.: US 7,832,861 B1
(45) Date of Patent: Nov. 16, 2010

(54) REVERSE PROGRESSIVE LENSES

(76) Inventor: Patrick Lee, 3111 St. Albans Dr., Los Alamitos, CA (US) 90720

( * ) Notice: Subject to any disclaimer, the term of this patent is extended or adjusted under 35 U.S.C. 154(b) by 0 days.

(21) Appl. No.: 12/647,720

(22) Filed: Dec. 28, 2009

Related U.S. Application Data

(60) Provisional application No. 61/146,308, filed on Jan. 22, 2009.

(51) Int. Cl.
*G02C 7/06* (2006.01)
(52) U.S. Cl. .................................. 351/169; 351/177
(58) Field of Classification Search ......... 351/168–172, 351/177
See application file for complete search history.

(56) References Cited

U.S. PATENT DOCUMENTS 5,984,473 A * 11/1999 Livnat ..................... 351/177

2008/0284977 A1* 11/2008 Huang ..................... 351/169

* cited by examiner

*Primary Examiner*—Scott J Sugarman
(74) *Attorney, Agent, or Firm*—Clement Cheng

(57) ABSTRACT

A method of making a reverse progressive lens has the steps of selecting a standard progressive lens having a distance zone, a transition zone and a near zone; selecting an add determination that is double or more than double in power; reversing the regular progressive lens by orienting it upside down; and cutting away the near zone so that the transition zone becomes the new near zone. To maintain convergence of the corridor channel, one by orders the OS lens with the OD power and the OD lens with the OS power. The method also includes measuring a distance PD, measuring the segment height and keeping the same cylinder axis such that rotating the lens 180° does not change the axis position. Selecting a standard progressive lens may include one with a distance zone, a corridor/transition zone and a near zone.

16 Claims, 1 Drawing Sheet

REVERSE PROGRESSIVE LENSES

This application claims priority from provisional application 61/146,308 Reverse Progressive Ophthalmic Prescription Lenses for Presbyopic Golfers by Patrick Lee, filed Jan. 22, 2009, the disclosure of which is incorporated herein by reference.

FIELD OF THE INVENTION

The present invention is in the field of indoor/outdoor friendly progressive spectacle lenses.

DISCUSSION OF RELATED ART

Progressive spectacle lenses provide a bifocal feature without a discernible line across the lens.

The lens power varies from one region to another without abrupt change. For activities such as golf, or other outdoor activities requiring similar visual demands, it is desired to have a progressive lens. Unfortunately, the present progressive lens is neither configured nor convenient for such outdoor activities. Although progressive lenses are widely available, it is desired to have progressive lenses suitable for outdoor activities such as golf.

An example of a short corridor progressive lens is shown in U.S. Pat. No. 6,142,627 to Winthrop, issued Nov. 7, 2000, the disclosure of which is incorporated herein by reference. Additionally, U.S. Pat. No. 5,805,265 to Umeda issued Sep. 8, 1998, the disclosure of which is incorporated herein by reference, shows a progressive lens that has along a principal meridian line, a variety of different viewing power from near to far.

Golfer lenses currently on the market and available for presbyopic individuals, or those who require a refractive correction in order to achieve 20/20 visual acuity at a near distance, are limited to bifocals placed in the temporal or nasal corners above or below the optic center and/or optic axis of the lens (ie. Spot-segment). The current bifocals provide a limited near viewing area, a poorly accessible near viewing area, and an unappealing cosmetic appearance.

SUMMARY OF THE INVENTION

The present invention is a new type of progressive spectacle lens for a presbyopic patient, or any person thereof who has difficulty seeing clearly at a near distance without a refractive correction, to play golf or engage in other outdoor activities without having to wear bifocal spectacle lenses. An object of the present invention is to allow presbyopic patients, or any person who has difficulty seeing clearly at near distances without a refractive correction, to be prescribed spectacles lenses that are more comfortable, efficient, and cosmetically appealing than a standard bifocal lens.

Utilizing the reverse or upside-down progressive eliminates any cosmetic line or spot-segment circle visible on the lens, centers the reading add prescription for ease of use, provides for a wider viewing area compared to the standard golfer spot-segment bifocal lens application, and allows for tinting and/or transition/photochromic applications to be utilized with these lenses.

The reverse progressive application is proposed to be manufactured with polycarbonate and trivex materials. Additional lens materials including all other plastics and glass can also be utilized. An upside down or reverse progressive lens can be made by beginning with a regular progressive lens. The "Golfer Friendly Progressive Lens" eliminates the need for a bifocal lens by reversing the standard progressive add location and placing the reading or add portion of the prescription above the optic center in the upper central and upper central/nasal portion of the lens.

The following definitions are helpful in understanding the invention

1. Distance PD Measurement: the distance between a patient's pupils measured in millimeters while a person/patient is looking straight ahead at a distance target.
2. Segment height: the distance measured in millimeters from the center of the person's pupils down to the bottom edge of the glasses frame.
3. Cylinder axis: the measured angle location in degrees where astigmatism (part of the patient's prescription) needs to be placed when correcting a patient's refractive error.
4. Axis position: the position where astigmatism (part of the patient's prescription) needs to be placed when correcting a patient's refractive error.
5. Upward gaze: when a person/patient looks in the upward direction.
6. Converging: when the two eyes are moved inward towards the nose.
7. OD lens: the lens corresponding to the right eye with or without prescription.
8. OS lens: the lens corresponding to the left eye with or without prescription.
9. Add: the amount of prescription power needed in order for the presbyopic person/patient to see things clearly (the person/patient's best corrected visual acuity) up close at a near distance which typically measures in the range of 14-18 inches.
10. Short corridor: The Hard/Short Corridor Design enhances clarity of distance vision versus other "soft design" progressive lenses because there are less or virtually no areas of aberration (distorted, blurred vision areas) in the distance zone of the lens. The hard/short corridor design also allows people to wear smaller frames with shorter vertical segment height measurements of the lens.
11. Progressive add: Progressive lenses allow for an uninterrupted view with a gradual focus change from far to near and everything in between without the traditional bifocal or trifocal lines.

Figure 1:
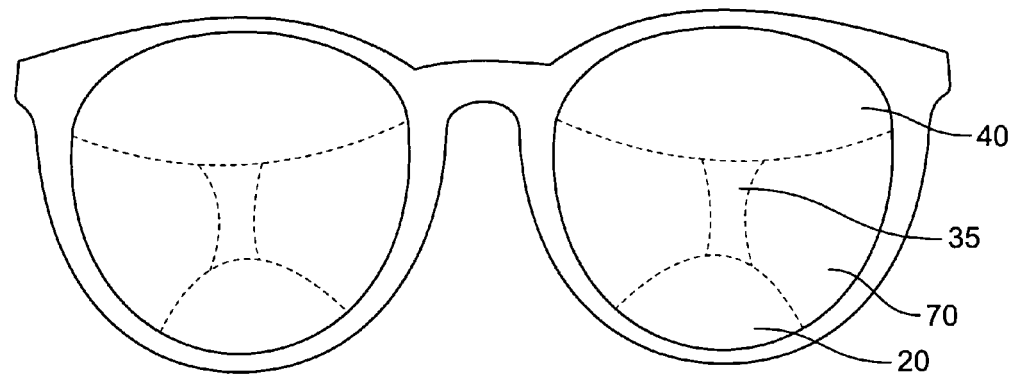
FIG. 1 is a diagram of a current progressive design golf lens with a progression corridor.
Figure 2:
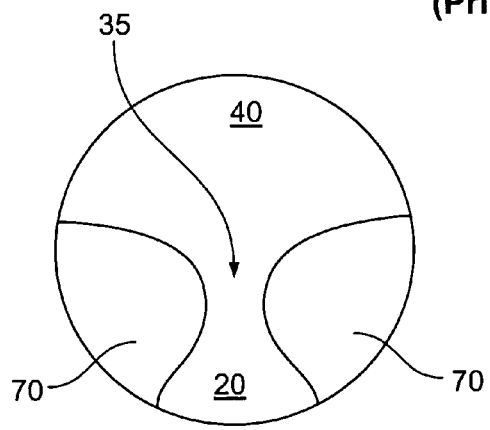
FIG. 2 is a diagram of a current standard progressive lens blank.

The following call out list of elements provides a reference for understanding the drawings:

20 near zone
35 intermediate zone, progression corridor
40 distance zone
50 targeted area of near add power
60 optical center
70 blended zone
88 eyeglass frames

DETAILED DESCRIPTION OF THE PREFERRED EMBODIMENTS

The present invention is a method of producing a lens having a bifocal feature, using currently available standard progressive lenses. In a standard progressive lens, there is a distance zone 40, an intermediate zone which could be a corridor zone 35 and a near zone 20. The present invention inverts the standard progressive lens, and then cuts off the near zone 20 so that it leaves only the intermediate corridor 35. Corridor 35 becomes the new near zone. There is also a blended zone 70 that is not generally usable by the viewer.

Figure 3:
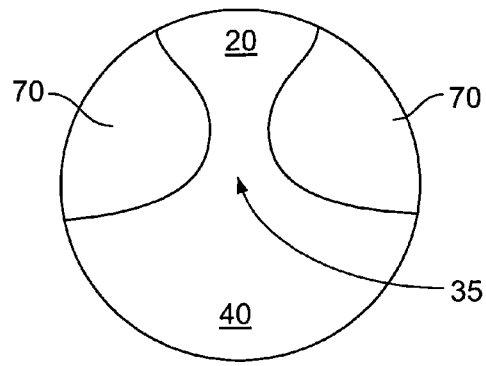
FIG. 3 is a diagram of the proposed invention of the reverse design progressive lens.
Figure 4:
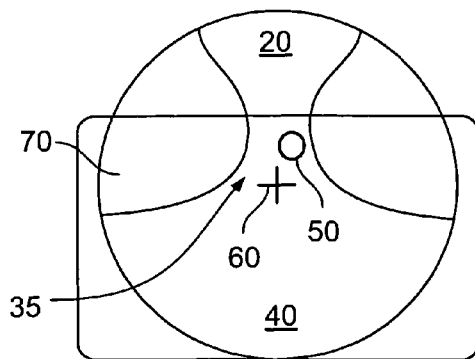
FIG. 4 is a diagram of the reverse set-up progressive lens.
Figure 4:
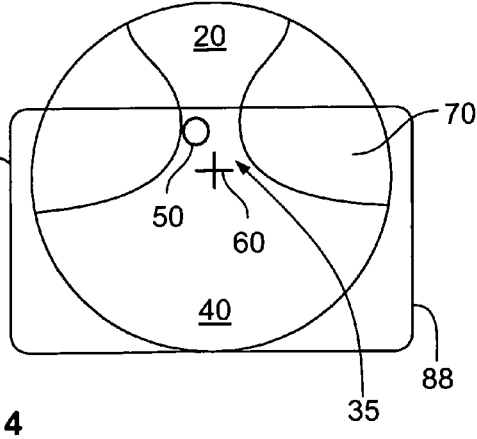

FIG. 4 shows a pair of rectangular areas that incorporate the lens area within the spectacle frames 88. The rectangle is an outline of the frame 88 of a pair of glasses. The + sign signifies the optical center 60. The circle 'o' is the targeted area 50 where the targeted near add power is located for optimal near vision. The eyes would align to the circle area 50 when looking up and converging. Accordingly, the circle area 50 shows where the add power is adjusted for near distance viewing. FIGS. 3, 4 are not to scale. Lens markings will vary based on adjustments needed to fit each individual.

The selection of the standard off-the-shelf progressive lens includes the steps of measuring the distance PD, measuring the segment height, and keeping the same cylinder axis such that rotating the lens 180° does not change the axis position. The corridor channel remains converging in an upper gaze after rotating the lens 180° because there is a switch of the lens in left to right orientation. More specifically, the OS lens is ordered with the OD refractive power and the OD lens is ordered with the OS refractive power. Left to right switch of power maintains convergence of the corridor channel while in upgaze.

The next step is to place the distance optical center at the measured segment height as seen in FIG. 4.

The add determination is indexed to a greater power that is double or more than double so that:

+1.00 uses a +3.00 progressive add
+1.50 uses a +3.00 short corridor progressive add
+2.00 uses a +4.00 progressive add
+2.50 uses a +4.00 short corridor progressive add When the transition zone is not a corridor shape, the transition zone may still be used as the new near zone.

The distortion area of the blended zone 70 is mostly cut out and removed. A reverse progressive lens with the add power oriented superiorly for close range near visual demands can be useful for a plumber, mechanic or anyone who has a near viewing demand above the visual/optic center or primary line of sight. The present invention therefore provides improved performance for viewing obstacles or objects on the ground outside the intermediate zone of vision.

The invention claimed is:

1. A method of making a reverse progressive lens comprising the steps of:
   a. selecting a standard progressive lens having a distance zone, a transition zone and a near zone;
   b. selecting an add determination that is double or more than double in power;
   c. reversing the regular progressive lens by orienting it upside down; and
   d. cutting away the near zone so that the transition zone becomes the new near zone.

2. The method of making a reverse progressive lens of claim 1, further comprising the step of: maintaining convergence of the corridor channel by ordering the OS lens with the OD power and the OD lens with the OS power.

3. The method of making a reverse progressive lens of claim 1, wherein the step of selecting a standard progressive lens further includes the step of measuring a distance PD.

4. The method of making a reverse progressive lens of claim 1, wherein the step of selecting a standard progressive lens further includes the step of measuring the segment height.

5. The method of making a reverse progressive lens of claim 1, wherein the step of selecting a standard progressive lens further includes the step of keeping the same cylinder axis such that rotating the lens 180° does not change the axis position.

6. The method of making a reverse progressive lens of claim 1, wherein the step of selecting a standard progressive lens further includes the step of selecting a standard progressive lens that has a distance zone, a corridor zone and a near zone.

7. The method of making a reverse progressive lens of claim 6, further comprising the step of: maintaining convergence of the corridor channel by ordering the OS lens with the OD power and the OD lens with the OS power.

8. The method of making a reverse progressive lens of claim 6, wherein the step of selecting a standard progressive lens further includes the step of measuring a distance PD.

9. The method of making a reverse progressive lens of claim 6, wherein the step of selecting a standard progressive lens further includes the step of measuring the segment height.

10. The method of making a reverse progressive lens of claim 6, wherein the step of selecting a standard progressive lens further includes the step of keeping the same cylinder axis such that rotating the lens 180° does not change the axis position.

11. The method of making a reverse progressive lens of claim 1, wherein the step of selecting a standard progressive lens further includes the step of measuring a distance PD; wherein the step of selecting a standard progressive lens further includes the step of measuring the segment height; wherein the step of selecting a standard progressive lens further includes the step of keeping the same cylinder axis such that rotating the lens 180° does not change the axis position.

12. The method of making a reverse progressive lens of claim 1, further comprising the step of: maintaining convergence of the corridor channel by ordering the OS lens with the OD power and the OD lens with the OS power; wherein the step of selecting a standard progressive lens further includes the step of selecting a standard progressive lens that has a distance zone, a corridor zone and a near zone, wherein the step of selecting a standard progressive lens further includes the step of measuring a distance PD, wherein the step of selecting a standard progressive lens further includes the step of measuring the segment height, wherein the step of selecting a standard progressive lens further includes the step of keeping the same cylinder axis such that rotating the lens 180° does not change the axis position.

13. The method of making a reverse progressive lens of claim 12, wherein the step of selecting an add determination that is double or more than double in power; involves a +1.00 power using a +3.00 progressive add.

14. The method of making a reverse progressive lens of claim 12, wherein the step of selecting an add determination that is double or more than double in power; involves a +1.50 power using a +3.00 short corridor progressive add.

15. The method of making a reverse progressive lens of claim 12, wherein the step of selecting an add determination that is double or more than double in power; involves a +2.00 power using a +4.00 progressive add.

16. The method of making a reverse progressive lens of claim 12, wherein the step of selecting an add determination that is double or more than double in power; involves a +2.50 power using a +4.00 short corridor progressive add.

\* \* \* \* \*